United States Patent [19]

Zeeland et al.

[11] Patent Number: 4,904,909

[45] Date of Patent: Feb. 27, 1990

[54] CONTROLLER FOR ELECTRIC CLAMP

[75] Inventors: Donald L. V. Zeeland, Franklin; Eugene F. Duncan, Wauwatosa; Gregory L. Nadolski, Brookfield, all of Wis.

[73] Assignee: Eaton Corporation, Cleveland, Ohio

[21] Appl. No.: 213,195

[22] Filed: Jun. 29, 1988

[51] Int. Cl.[4] ........................................ H02P 1/00

[52] U.S. Cl. ........................................ 318/258; 318/266; 318/259

[58] Field of Search ............... 318/266, 567, 286, 599, 318/593, 258, 282, 283, 592, 259, 269-272, 366, 369, 364

[56] References Cited

U.S. PATENT DOCUMENTS

| | | | |
|---|---|---|---|
| 3,673,482 | 6/1972 | Davey | 318/266 |
| 4,092,575 | 5/1978 | Ogishi et al. | 318/286 X |
| 4,571,530 | 2/1986 | Sweeny, Jr. | 318/593 X |
| 4,614,902 | 9/1986 | Jessup | 318/282 |
| 4,672,281 | 6/1987 | Yagusic et al. | 318/592 |
| 4,751,442 | 6/1988 | Kurakhake | 318/567 |
| 4,808,898 | 2/1989 | Pearson | 318/599 X |

*Primary Examiner*—William M. Shoop, Jr.
*Assistant Examiner*—A. Jonathan Wysocki
*Attorney, Agent, or Firm*—C. H. Grace

[57] ABSTRACT

A controller for an electric clamp closes the clamp rapidly at first, then runs at a slower speed while contacting the workpiece, and speeds up again after contacting it, to close with full clamping force. Arrival of the clamp at the position for slowing down is directly detected by means of a proximity sensor, as are arrivals at other positions. The speed of operation is relatively insensitive to the voltage of its AC electrical power source because an open-loop compensating signal controls the pulse duration of rectified DC pulses that drive the motor. The controller has dynamic braking that is applied between individual pulses of pulse trains of motor current; this results in sigficant increase in swings of current values for a given motor speed, that reduces harmful effects of mechanical friction. Two jogging speeds are selectable.

13 Claims, 9 Drawing Sheets

CONTROLLER FOR ELECTRIC CLAMP

FIELD AND BACKGROUND OF THE INVENTION

Power clamps are used in automotive and other industries for clamping together two workpieces, for example, while they are being welded. Pneumatic, hydraulic and electrically powered clamps have been used. The electric clamps produce no exhaust fumes, contamination, loud noise, nor leakage, and require no plumbing or seals. An example is described in U.S. Pat. No. 4,723,767, Appl. No. 894,963, Filed Aug. 8, 1986, issued Feb. 9, 1988, of inventor Alexander W. McPherson, which is incorporated herein by reference. It is a rotary-powered, linearly-actuated clamp having a hollow electric motor drive shaft coupled to rotate a threaded nut. The nut is axially retained by reaction roller thrust bearings to enable it to drive a linear threaded rod. The rod has an integral toggle linkage actuator, guided by anti-friction rollers in linear reaction tracks.

SUMMARY

An object of the invention is to provide a controller for an electric clamp, which is fast, light, reliable, easy to set up, usable with a convenient energy source, gentle to the workpieces, safe, and almost entirely self-contained.

Another object is to provide a controller that closes a clamp rapidly at first, then runs at a slower speed while contacting the workpiece, then speeds up after contacting it, to close with full clamping force. Arrival at the position for slowing down is directly detected by means of a sensor.

Another object is to provide a controller whose speed of operation is relatively insensitive to the voltage of its electrical power source by providing an open-loop compensating signal that controls the pulse duration of DC pulses that drive the motor.

Another object is to provide a controller with dynamic motor braking for quick, precise stops.

Another object is to provide a controller with dynamic braking between each individual pulse of DC power (in a train of power pulses), to achieve a desired speed reduction (for speed control) at the same time that high steps of current pulses are provided to overcome friction forces of the clamp.

These and other objects are made clearer by the description, claims and drawings.

DESCRIPTION OF THE PREFERRED EMBODIMENT

Mechanical Arrangement

Figure 1:
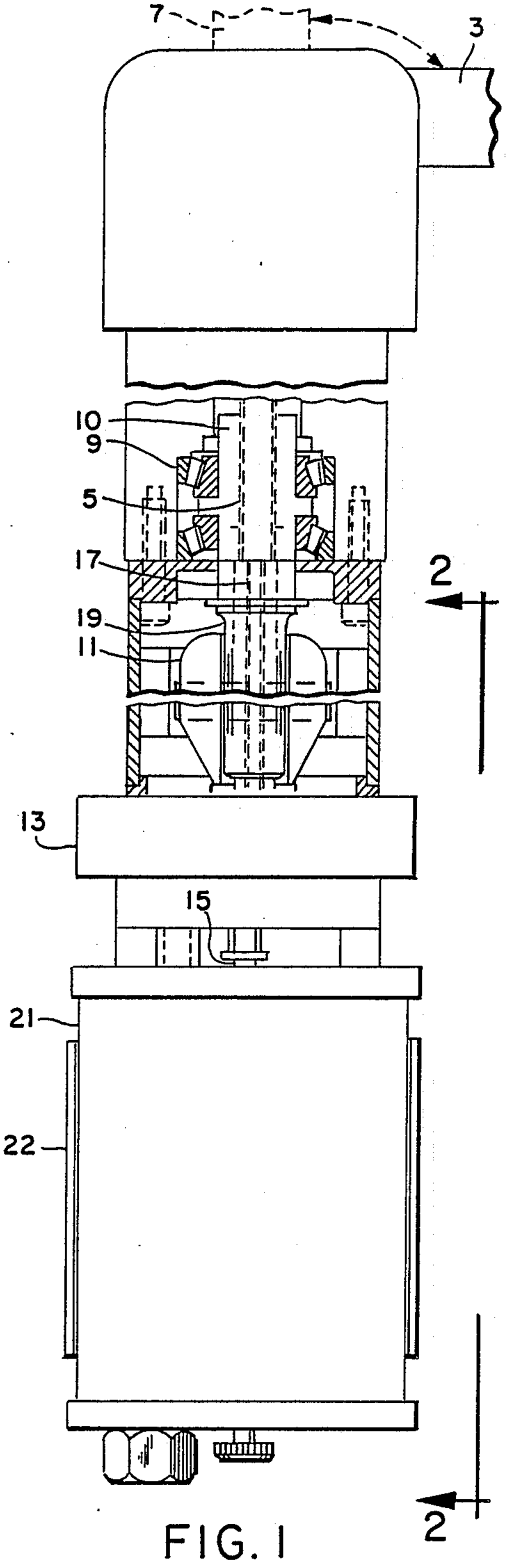
FIG. 1 is a side view of a clamp utilizing the preferred embodiment of the invented controller.

As shown in FIG. 1, the clamp 1 has a clamp arm 3 (only one end shown on the figure), that can be swung about to another position 7 by axial movement of a threaded rod 5. The rod 5, which does not rotate, is linked to the arm 3, and is advanced and withdrawn by the thrust of an axially fixed bearing 9, when an axially retained tang-driven nut 10 is rotated by the shaft of a permanent magnet DC motor 11. The motor has a conventional commutator and brush assembly generally indicated at 13.

An indicator rod 15, which it is coupled to the rod 5, extends from a point 17 through a hollow shaft 19 of the motor 11 and into a controller unit 21. When the motor shaft 19 is rotated by the motor 11, the nut 10 rotates and drives the rod 5 axially. At the same time, the indicator rod 15, which is pinned to the rod 5, moves axially. The position of one of its ends, which travels in the control unit 21, is an indication of the angular position of the clamp arm 3. A terminal access cover 22 is provided over the control unit 21.

Figure 2:
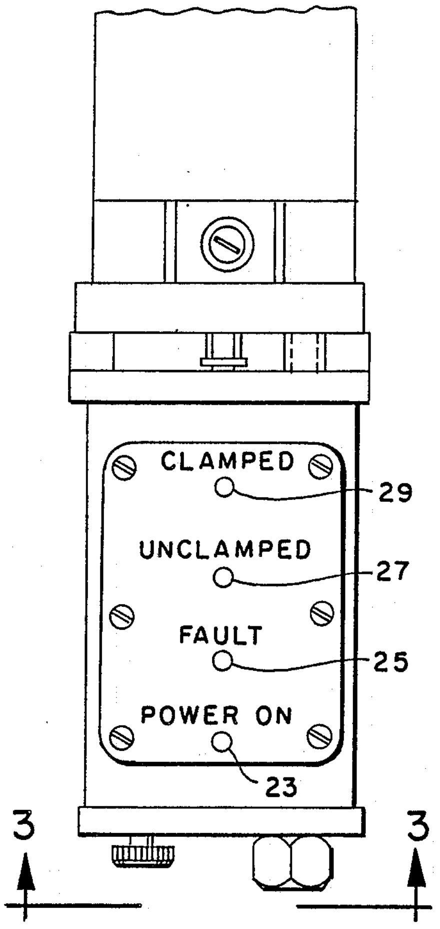
FIG. 2 is a top view of a controller portion of the same clamp.

FIG. 2 shows lamps 23, 25, 27, 29 for indicating "power on", "fault", "unclamped" position of the arm 3, and "clamped " position of the arm 3, respectively.

Figure 3:
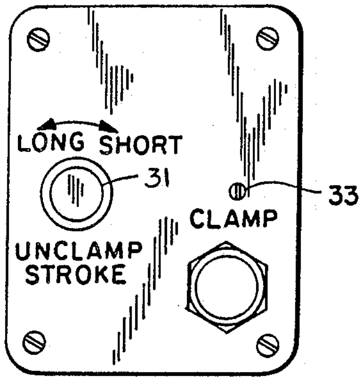
FIG. 3 is an end view of the controller portion.

In FIG. 3 adjustment controls 31, 33, are shown for setting the unclamped (open) position of the clamp arm 3 and the clamped (closed) position of the clamp arm.

Figure 4:
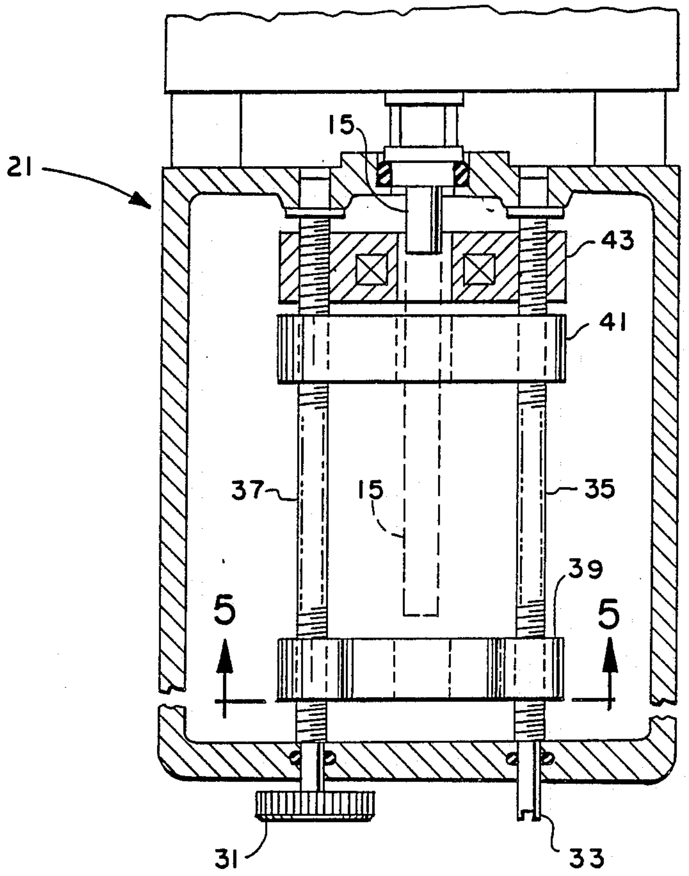
FIG. 4 is a cutaway view of the same portion as that of FIGS. 2 and 3.

When the terminal access cover 22 of the control unit is removed the interior of the control unit 21 is visible as in FIG. 4. The indicator rod 15 is shown in solid lines in its fully clamped position and in dotted lines in a position almost fully extended for unclamping or opening. Its position can be detected by three coils 39, 41, 43, which are mounted on two parallel rods 35, 37. Coil 39 is part of an "unclamped" position sensor. Coil 41 is part of a "slow down" position sensor, and the third coil 43 is part of a "clamped" position sensor.

The location of the "unclamped" position sensor coil 39, which has an interior thread that engages threads on the rod 37, is adjustable by rotation of the "unclamp stroke" adjustment knob 31. Similarly, the location of the "clamped" sensor coil 43 is adjustable by rotation of the threaded rod 35 which is part of the "clamped" adjustment 33. The "slow down" sensor coil 41 is mounted in a position close to the "clamped" sensor coil 43 and cannot be readily adjusted externally by the operator of the equipment.

Figure 5:
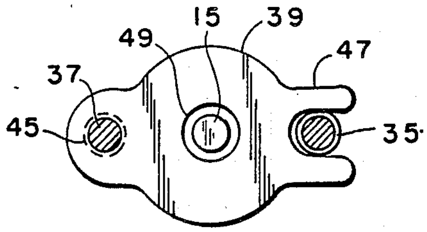
FIG. 5 shows the shape of a sensor coil housing, of which three are depicted in FIG. 4.

The shape of the enclosure of the sensor coil 39 is shown in plan view in FIG. 5. A hole 45 is threaded to engage the rod 37 and a clevis 47 straddles the other rod 35. A pass hole 49 in the center of the coil housing easily accommodates passage of the position indicator rod 15.

Performance Curves

Figure 6:
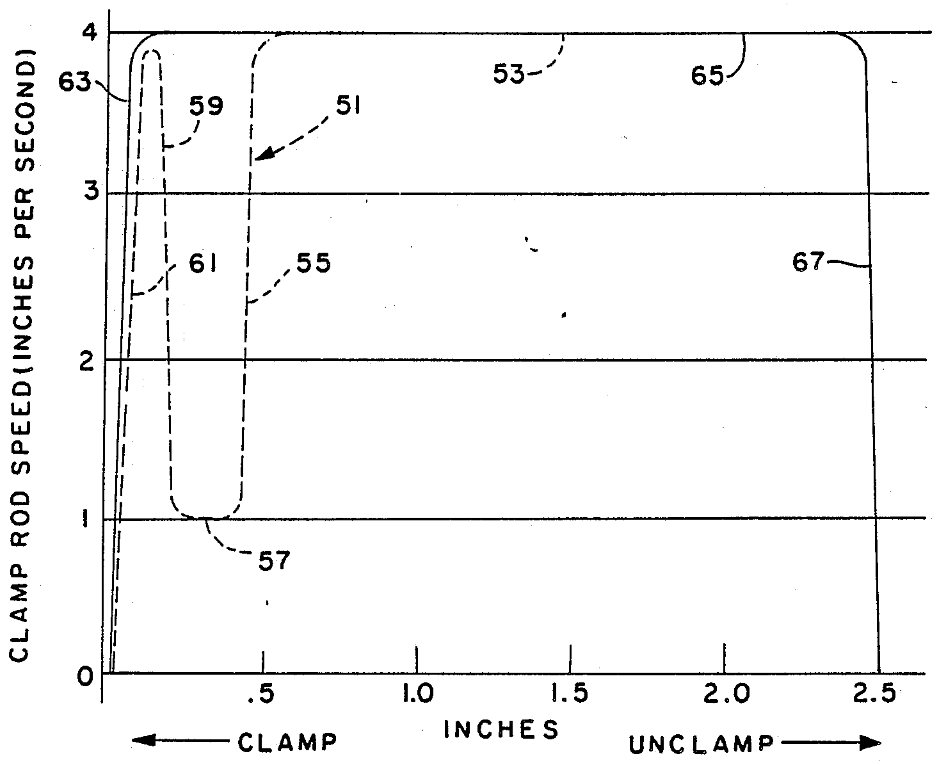
FIG. 6 is a graph showing the speed of the clamp as a function of distance from its closed position.

FIG. 6 has a dashed line curve 51 that has a horizontal portion 53, which coincides with a solid line at the top center of the graph. That top center portion of the curve 51 represents the high-speed run-up of the clamp from an open position at the right toward a closed position at the left. The dashed curve 51 also has a generally vertical portion 55 which shows a rapid deceleration of the actuator rod 5 prior to the clamp arm's contacting of the workpiece.

A low-speed and low-force horizontal portion 57 of the curve 51 indicates the speed at which the clamp arm approaches and contacts the workpiece. The distance that the clamp moves after making contact with the workpiece varies with reaction forces. The duration of the low-speed interval 57, however, is controlled by a 300 millisecond timer. In another portion 59 of the curve 51 the clamp returns to high speed and high force following the 300 millisecond interval of low speed. The clamp then drives, as shown in a portion 61 of the curve 51, to a consistent stopping position with full force.

When an unclamp command signal is provided, the clamp opens along a curve represented by a solid line 63. Its opening speed rises rapidly to the top of the graph and continues along a horizontal line 65 to a fully open position, where a curve segment 67 shows the speed declining rapidly to zero.

Figure 7:
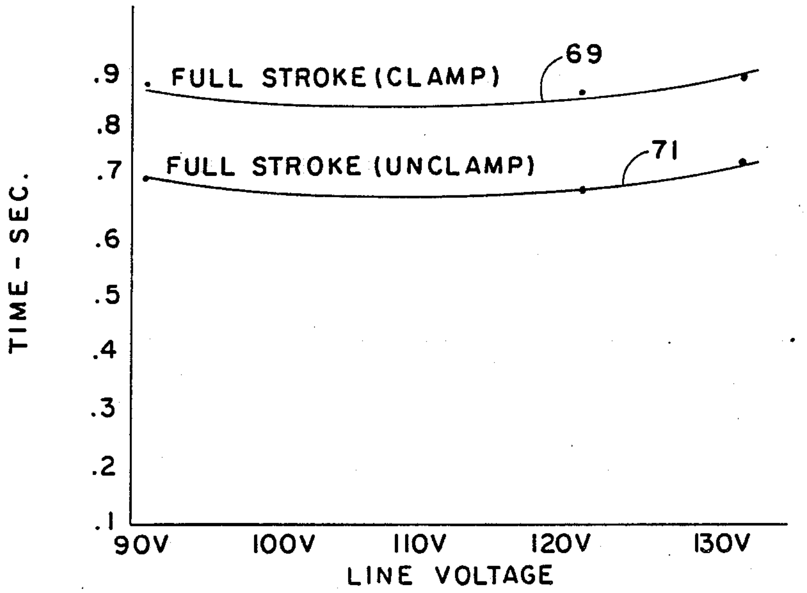
FIG. 7 is a graph illustrating that the effects of line voltage variations on the times required for closing and opening the clamp are very small.

The speeds shown in FIG. 6 vary only slightly over a very wide range of line voltage changes of the AC power source. FIG. 7 includes a graph 69 of the elapsed time in closing the clamp, as a function of line voltage, for line voltages between 90 volts and 132 volts. The graph 69 is an almost straight horizontal line. The elapsed time for opening the clamp is shown as curve 71. Both curves show variation of only about 7 percent in actuation times within the voltage range.

Figure 8:
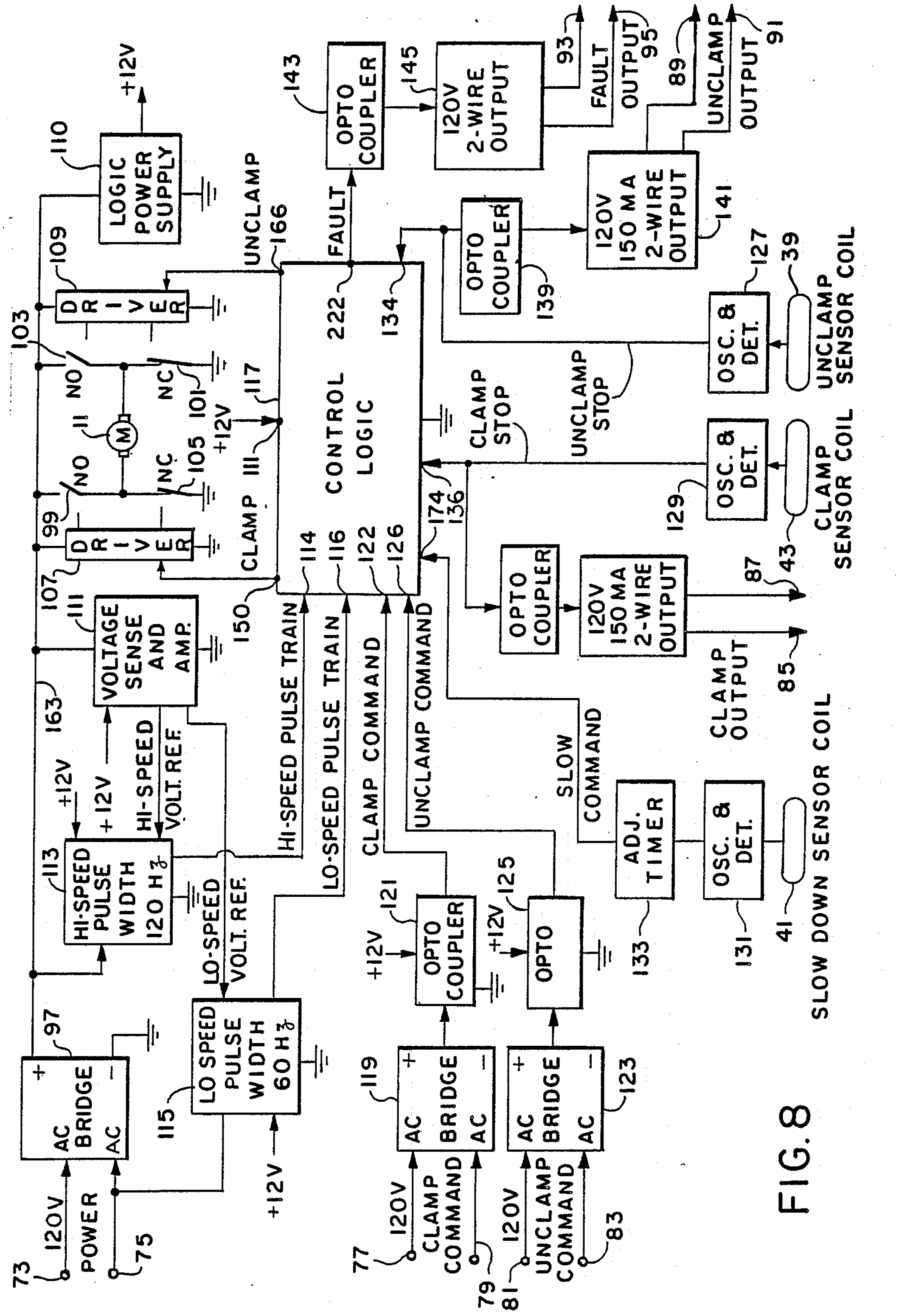
FIG. 8 is a block diagram of the electronic controller.

Electronic Block Diagram, FIG. 8

Electronic circuits that make possible the performance shown in FIGS. 6 and 7 and other performance features of the invention, will now be described. In the electronic block diagram of FIG. 8 the DC motor 11 is shown, connected to four switches in an "H"-shaped configuration.

Inputs and outputs of FIG. 7 are as follows. Power for the controller enters at input terminals 73, 75; commands to close the clamp enter at input terminals 77, 79; and commands to open the clamp enter at terminals 81, 83. The motor is also controlled by changes in the clamp's actual position as detected by the "unclamped" sensor coil 39, the "slow down" sensor coil 41, and the "clamped" sensor coil 43, all of which are shown at the bottom of FIG. 8. Outputs from the clamp as a whole are (in addition to the mechanical position of the clamp arm itself), a clamped output signal at terminals 85, 87; an unclamped output signal at terminals 89, 91; and a fault indication at terminals 93, 95. That concludes the identification of inputs and outputs of the clamp apparatus as a whole.

FIG. 8 also shows main interconnections among major subcircuits of the controller. Those interconnections are briefly described below first, after which details of individual subcircuits are described by reference to other figures, in the order of the figure numbers. At the top of FIG. 8 the DC motor 11 is connected to a bridge rectifier 97 by switches 99 and 101 or by switches 103 and 105. These switches are semiconductors, which are driven by driver circuits 107 and 109. Details are shown on FIG. 9, which is described later.

Figure 10:
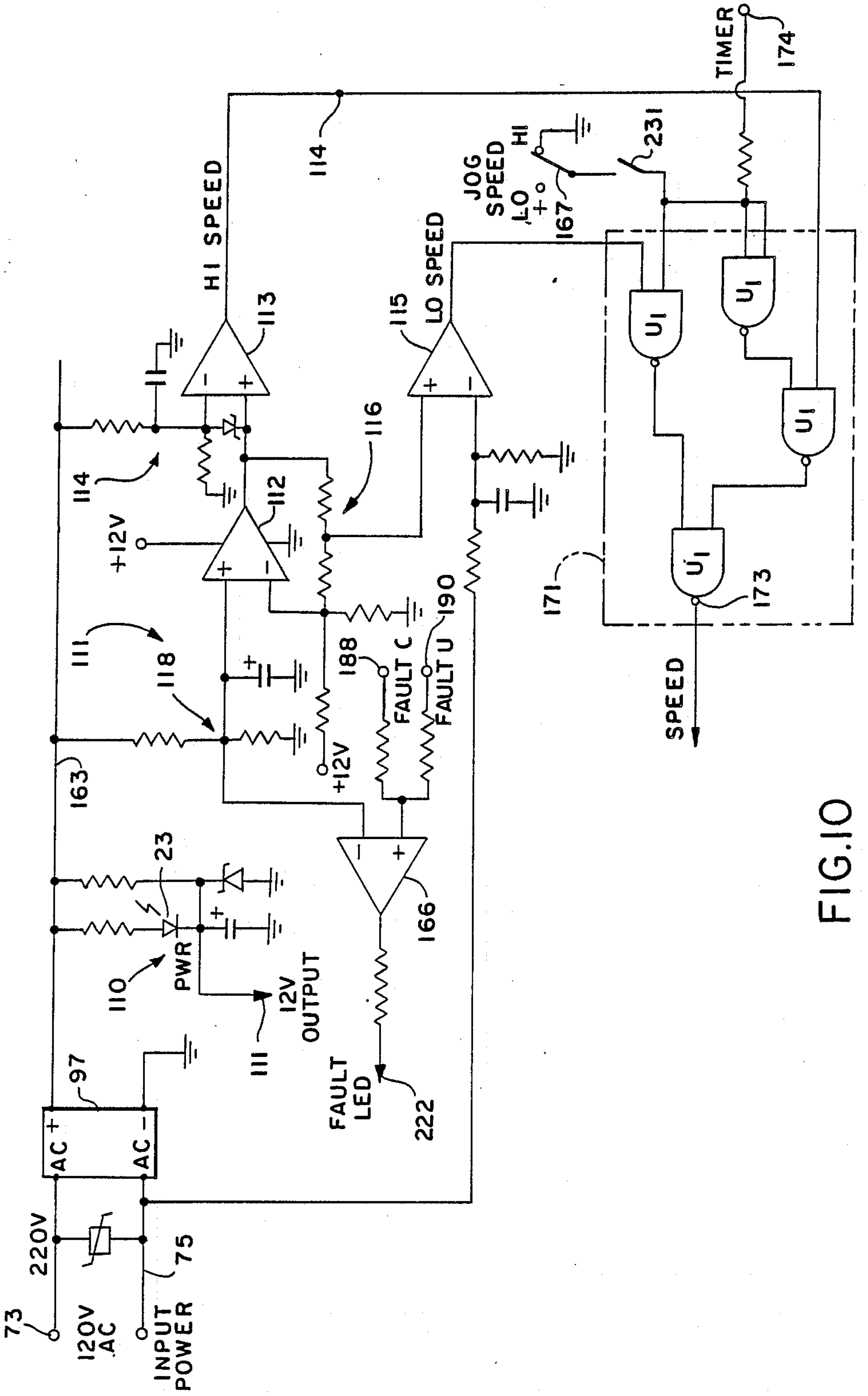
FIG. 10 is a schematic diagram of the power supply for the motor and its open loop compensation circuits.

A voltage sensor 111 measures the DC voltage of a bus 163 and supplies corresponding voltage levels to a high-speed pulse duration circuit 113 and a low-speed pulse duration circuit 115. They, in turn, produce 120 Hz and 60 Hz pulse trains of variable pulse durations for regulating the speed of the motor in high-speed and low-speed operation. FIG. 10 shows the details of these subcircuits, which are described later.

Figure 11:
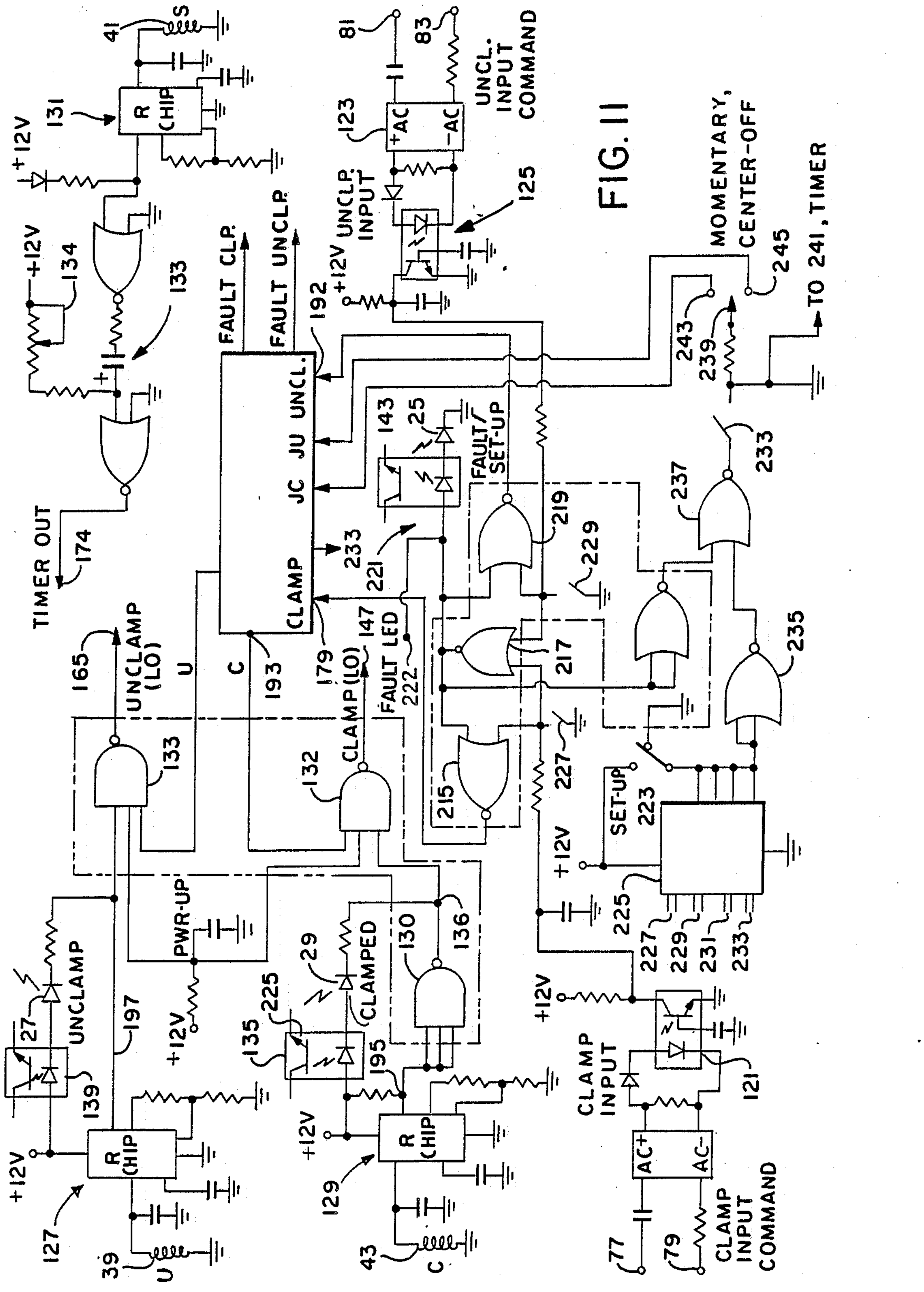
FIG. 11 is a detailed diagram of a portion of the controller that includes its position-sensing coils.
Figure 12:
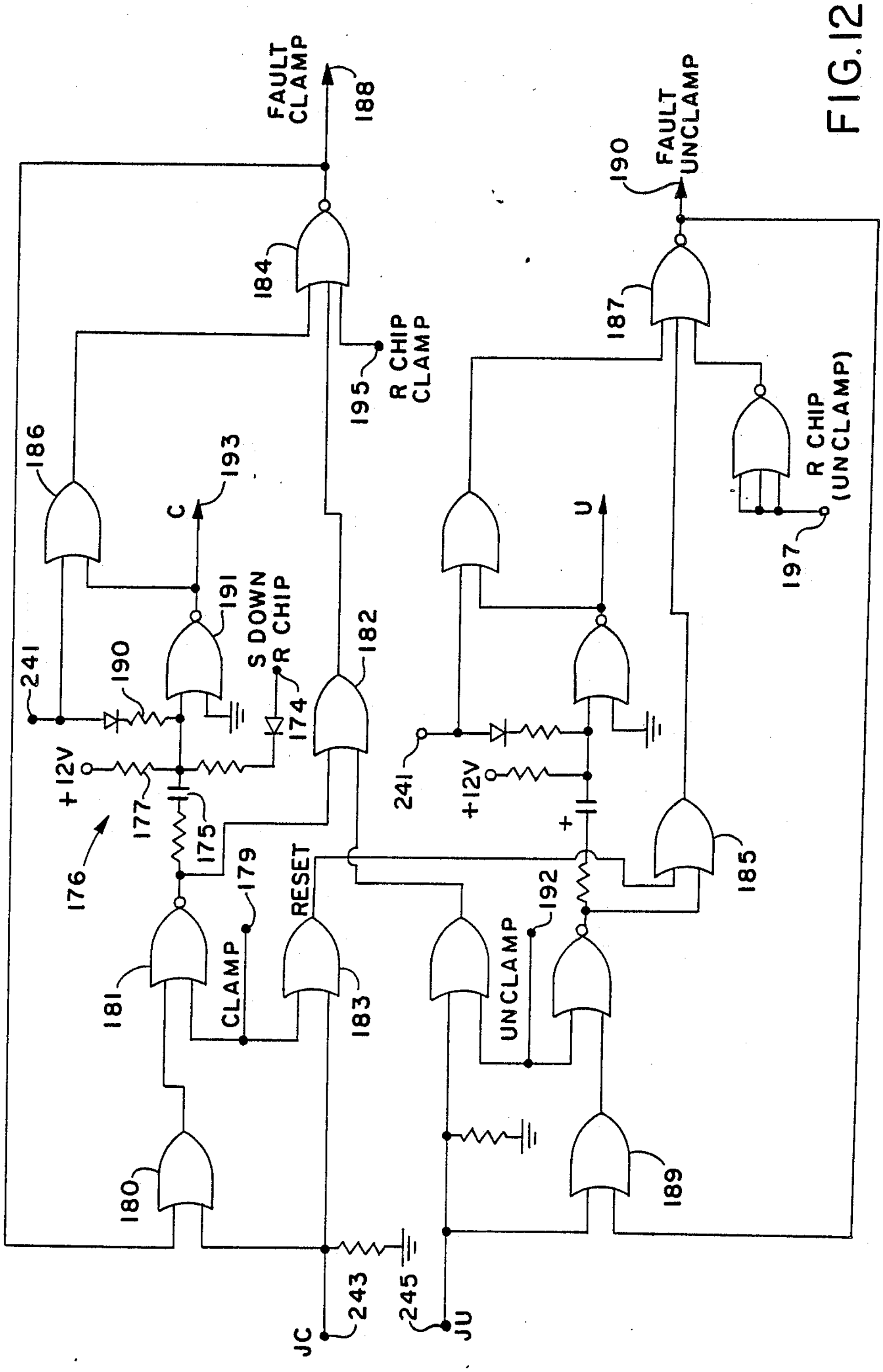
FIG. 12 is a detailed schematic diagram of a control logic portion of the controller.

The high-speed pulse train and low-speed pulse train are transmitted to the driver circuits 107, 109 by way of a control logic circuit 117 (FIGS. 11 and 12).

FIG. 8 also shows a bridge rectifier 119 and an optical coupler 121 that receive clamp commands from terminals 77, 79 and transmit them to the control logic circuit 117. Similarly, unclamp commands from terminals 81, 83 are processed through a rectifier 123 and an optical coupler 125 and transmitted to the control logic.

The unclamped sensor coil 39 (FIG. 8), feeds an oscillator and detector 127, which is connected to the control logic circuit 117. The clamped sensor coil 43 and its associated oscillator and detector 129, as well as the slow down sensor coil 41, with its oscillator and detector 131, and its timer 133, feed their output signals to the control logic circuit 117. Details of these circuits are discussed below in connection with FIG. 11.

Continuing with FIG. 8, status output signals at the terminals 85, 87 are provided by coupling an output of the oscillator and detector 129 to an optical coupler 135 and then to a two-wire output circuit 137. Similarly, status signals from the oscillator and detector 127 are input to an optical coupler 139, which feeds an output circuit 141 whose output is at the terminals 89, 91. An identical type of output coupler 143 drives an identical output circuit 145 to process fault signals that the optical coupler 143 receives from the control logic circuit 117, and to present them at the fault status output terminals 93, 95. These optical couplers and output circuits are described in more detail in connection with FIG. 13.

Figure 9:
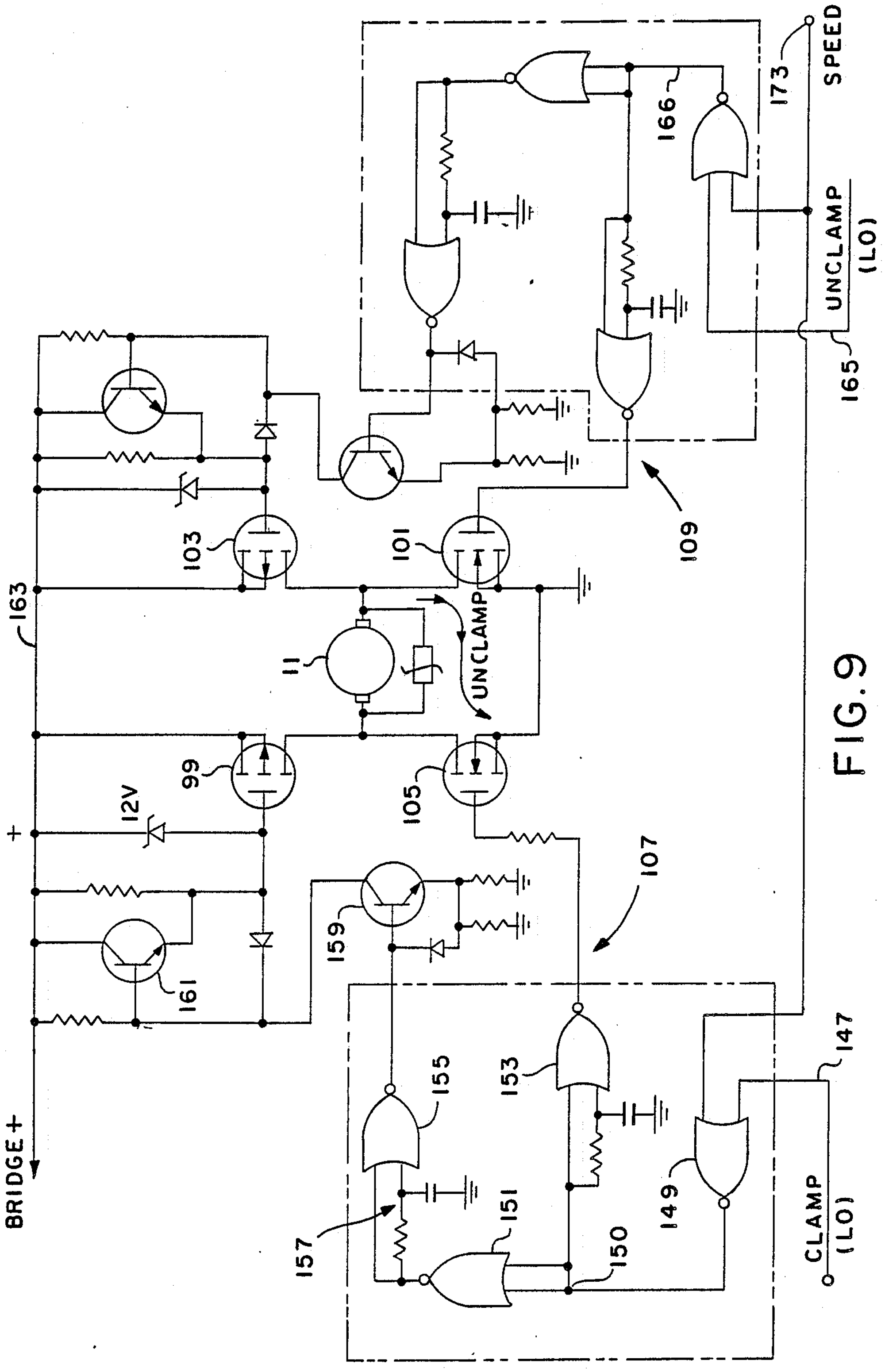
FIG. 9 is a detailed schematic diagram of the motor switching circuits.

Motor Drive Circuits, FIG. 9

The DC motor 11 (FIG. 9) is rated to operate over a wide DC voltage range and is suitable for operation from a rectified 120-volt power line. In this apparatus DC power for the motor comes from a full-wave bridge rectifier without filtering. The motor 11 is connected in an "H" configuration of switches, which are capable of sending current through the motor to drive it in the clamping direction when semiconductors 99 and 101 are both conducting. Current passes in the opposite direction through the motor 11 to drive it in an unclamping direction when semiconductors 103 and 105 are both conducting.

In the absence of commands to the contrary, the lower transistors 101, 105 are both normally on, i.e., conducting; they provide the dynamic braking of the device. They provide a retarding force for speed control and stopping. The upper two P-channel MOSFETs are normally off.

The "H" switch configuration comprises P-channel MOSFETs for the upper switches 99, 103, and N-channel MOSFET for the lower switches 101, 105. Two P-channel transistors are used in parallel for each upper switch to achieve a 2 ohm ON resistance. Each lower switch 101, 105 comprises only one transistor of a type having a resistance of about 1 ohm when conducting. No external dynamic braking or snubbing resistors are required. The motor resistance itself is about 21 ohms, and the two transistors 101, 105 in series have a total resistance of about 2 ohms.

A risk in using "H" switches is of a "shoot-through", i.e., current simultaneously through the upper and lower transistors on the left-hand side (or the two transistors on the right-hand side). Shoot-through is prevented here by time delays. Commands at terminal 147 (FIG. 9) to close the clamp, are input to a CMOS NOR gate 149. The output of 149 connects to inputs of gates 151 and 153. The output of inverter gate 151 connects to an input of a NOR gate 155, but an RC circuit 157 at one input of gate 155 provides a delay. The output of gate 155 drives an amplifier comprising transistors 159 and 161 that can turn on transistor 99 by a current spike at its gate, which is clamped by a 12-volt Zener diode.

When a clamp command occurs, the signal at terminal 147 goes to zero. The lower MOSFET 105 is turned off immediately by NOR gate 153. The upper transistor 99 is not turned on until a 50-microsecond delay of circuit 157 elapses. When MOSFET 99 finally turns on, current flows from the bridge's positive output bus 163 through transistor 99, through the motor 11 and transistor 101 to ground and back to the bridge. The time delay 157 has prevented shoot-through of transistors 99 and 105.

The NOR gate 149 has another input 162 which has a "speed" signal. It is a pulse train whose pulse widths vary depending upon and to compensate for the line voltage feeding the bridge.

In the unclamped (opening) mode, an unclamp signal at a terminal 165 changes from 1 to zero, and it operates a circuit generally indicated as 109, which is identical to the clamp circuit just described. During unclamping, current flows through transistor 103, through the motor and through the normally-conducting transistor 105 to ground, to drive the motor in the opening direction. A logic circuit in the system prevents clamp and unclamp commands from existing at the same time.

Speed Signals, FIG. 10

One advantage of this invention is that the time for opening and closing the clamp are almost independent of the line voltage. This is to insure that setup speeds are faithfully reproduced independently of line voltages after setup, and also for uniformity during operation. Constant speeds are achieved by monitoring the DC bus (163) voltage and compensating the pulse durations of the clamp and unclamp pulse trains depending upon the line voltage.

FIG. 10 shows the circuits that accomplish this. A voltage at the DC supply's positive bus 163 is unfiltered, and therefore has a great amount of ripple, whose lowest frequency component is at 120 Hz. The bus voltage is sampled by an operational amplifier 112, through a resistive divider 114, and is smoothed to produce a measure of average value of bus voltage. The output of amplifier 112 is connected to a high-speed pulse train amplifier 113, and also through a resistive voltage divider 116 to a low-speed pulse train amplifier 115.

Amplifier 113 serves as a comparator that compares the average voltage at the output of amplifier 112 (a threshold), with an instantaneous voltage from a resistive voltage divider 118. The divider 118 samples the DC voltage on bus 163, including its unfiltered 120 Hz ripple. This sensing channel has lower gain than the threshold channel.

Amplifier 113 provides at its output a 120 Hz pulse train, which steps between zero volts and +12 volts. The train's pulses are of about 8 milliseconds duration when the line voltage at terminals 73, 75 is 90 volts rms, and about 5 milliseconds duration when that AC line voltage is 132 volts, because of corresponding changes in the threshold voltage from amplifier 112. The pulses are approximately centered on the voltage lobes of 120 Hz ripple of bus 163. During closing of the clamp, the dynamic braking is operative between the pulses; this reduces the closing speed of the clamp slightly even during the high speed closing intervals, by time averaging of forces on the motor. The changes of pulse duration compensate for changes of amplitude of the voltage on the DC bus 163, to provide constant motor speed.

The low-speed comparator 115 receives its filtered threshold signal from the voltage divider 116, which varies in accordance with the average voltage on the positive DC bus 163. The signal with which that reference is compared comes from the input power terminal 75 and is applied to a second input of the comparator 115. That signal has a 60 Hz AC component. The low-speed output pulse train from comparator 115 has pulses that vary in duration from 4 milliseconds at 90 rms of line voltage to 2.6 milliseconds at 132 volts of line voltage. The variations in pulse duration compensate for amplitude variations in voltage at DC bus 163. The system uses the first harmonic of the 60 Hz power source for its low-speed pulse train and the second harmonic thereof for its high-speed pulse train.

A logic circuit 171 selects either the high-speed pulse train from comparator 113 or the low-speed pulse train from comparator 115 and outputs the selected pulse train at a speed signal output terminal 173. Selection of pulse trains by the switching circuit 171 is controlled by a signal at a terminal 174 that is provided by a 300-millisecond timer 133 of FIGS. 8 and 11. A logic 1 appears at terminal 174 to put the motor in low speed mode 57 (FIG. 6) in response to the slow-down coil 41 during normal operation of the clamp.

A jog speed circuit is also shown on FIG. 10, including a selector switch 167 for selecting high or low jog speed. An isolated transmission switch 231, when closed, enables the jog speed selector 167 to control the selector 171. The switch 231 is closed when in a setup mode of operation; it is described more fully in connection with a transmission gate 225 shown on FIG. 11.

FIG. 10 also shows a conventional 12-volt Zener-regulated power supply for logic circuits, indicated generally by reference number 110.

A circuit 166 for combining clamp and unclamp fault signals and providing an output to a fault indication light-emitting diode is also shown on FIG. 10. Circuit 166 receives its inputs at terminals 188 and 190, which are driven by gates 184 and 187 of FIG. 12. The output terminal 222 of circuit 166 connects to an optical coupler 143 of FIG. 11 for producing fault output signals.

Clamp Command and Sensor Coil Circuits, FIG. 11

FIG. 11 includes command input circuits 119, 121 (clamp input commands), and 123, 125 (unclamp input commands), which are received from external sources at terminals 77, 79, 81, and 83. FIG. 11 also shows the position sensor input circuits 127 (unclamp), 129 (clamp), and 131 (slow down), all of which process inputs for presentation to the control logic circuit 117 (see FIGS. 8 and 12).

The optical couplers 121, 123 are non-conducting until a command occurs. The signals of both of them are processed through a simple logic circuit 215, 217, 219, whose purpose is to monitor them. The apparatus recognizes only one command at a time, for safety reasons. Details of the logic circuit's operation are as follows. When a clamp signal occurs, the optical coupler 121 receives a signal and outputs a logic zero. The logic zero is conducted via a terminal 122 (which is shown also on FIG. 8) to the gates 215 and 217, causing their outputs to rise to a logic 1. That logic 1 signal goes as a clamp command into terminal 179, which is shown also on FIG. 11.

Similarly, when an unclamp command is given, its zero level enters the gate 217 and the NOR gate 219, via a terminal 126.

In the event that both clamp and unclamp inputs are present at the same time, both of the inputs of the NOR gate 217 receive zeros, which makes the output of gate 217 a 1 level. That output is connected to an input of the NOR gates 215 and 219, so it inhibits the gates 215 and 219 from being responsive to the clamp and unclamp signals respectively at their other inputs. The gate 217 also provides a 1 signal to the fault optical coupler 143 at terminal 221 and a fault lamp as shown on FIG. 12.

Three proximity switches having coils 39, 41, 43 are also shown on FIG. 11. When the position-indicating rod 15 passes inside any of the coils, the proximity switch circuit associated with it, which has been oscillating, stops oscillating because of losses induced in the rod 15. The oscillators 127, 129, 131, which are known in the prior art, are shown in block form on FIG. 11.

In the clamping mode, a clamp command signal results at first in a high-speed train of pulses into the motor 11, which drives the clamp actuator rod 5 and the position indicator rod 15 to move axially toward closing of the clamp. When the indicator rod 15 reaches the slow-down sensor coil 41, it causes a slow-down command. The logic circuit places the motor in a low-speed mode for a predetermined time period. The duration of the period is adjustable and typically is set to 300 milliseconds.

At the end of that time the high speed is resumed again, because presumably by then the movable arm 3 of the clamp has contacted the workpiece gently at the low speed. Finally, the indicator rod 15 passes out of the clamped position sensor 43. The oscillator 129 starts oscillating, and produces a clamped output signal, which signifies that the clamp arm 3 is in a fully closed position. A NAND gate 130 is connected as an inverter to drive a NAND gate 132 whose output provides direct position feedback to the control logic circuits 117 to verify that the arm 3 is in the clamped position.

A clamp command signal at terminals 77, 79 starts the motor 11 and the clamped position feedback signal from gate 132 stops it. The output signal from gate 130 goes to a terminal 136 which connects with a NAND gate 132 shown on FIG. 11, which stops the motor 11 to end the clamping operation.

Figure 13:
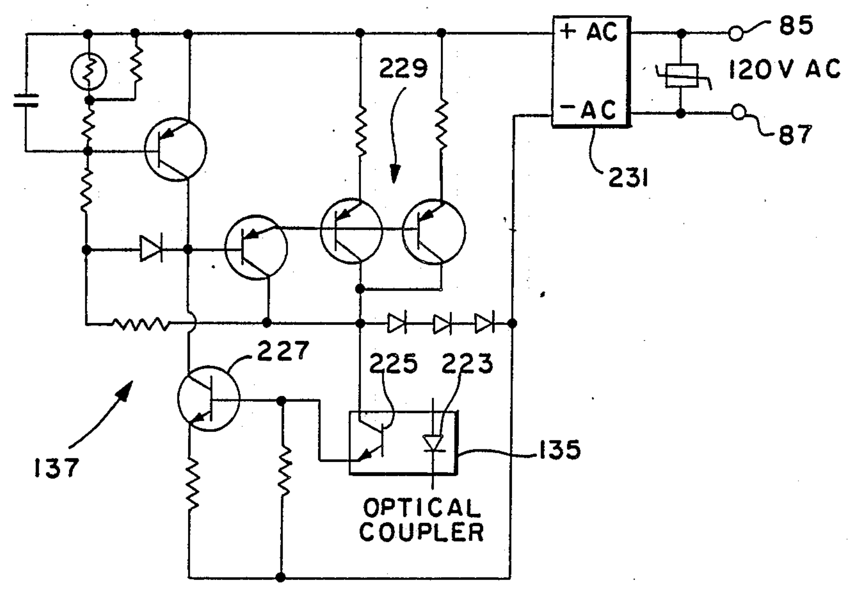
FIG. 13 is a schematic diagram of an output stage, of which there are three in the controller.

The output of NAND gate 130 also illuminates a "clamped" lamp diode 29 and a diode 223 in the optical coupler 135, which provide output signals as shown on FIGS. 8, 11, and 13.

For setting up, a switch 223 (FIG. 11) is moved from normal position to setup position. This enables operation of a transmission gate 225, which has four isolated switches, 227, 229, 231, and 233. During setup the isolated switches override normal operation at various circuits to which they are connected. Switch 227 of the transmission gate shorts out and mimics the clamp command at an input of NOR gate 215. Switch 229 performs a similar function for unclamp commands at an input of NOR gate 219. Switch 231, when closed, enables the jog speed selector switch 167, which is shown on FIG. 10.

In the setup position, switch 223 supplies a logic 1 to a NOR gate 235 (which is connected as an inverter), whose output provides a logic 0 to one input of a NOR gate 237. Switch 233 connects a logic 1 signal from the NOR gate 237 output to a momentary center-off jog switch 239, and to a terminal 241 that connects to a multivibrator timer shown on FIG. 12.

One position 243 of the switch 239 is a jog clamp (JC) position, for jogging in the clamping or closing direction. The other position 245 of switch 239 is jog unclamp (JU) position, for jogging in the unclamping or opening direction. Each time the jog switch 239 is moved to an off-center position the motor 11 receives a timed envelope of pulses that drive it one step in the selected direction. Its speed is controlled by selector switch 167. A jog signal at terminal 241 changes the time constant of the timing circuit 176 (FIG. 12) by placing a resistor 190 in parallel with the resistor 177, as described below in the paragraphs regarding FIG. 12.

The slow-down coil 41 and its oscillator circuit 131 (FIG. 11), operate a timer 133 of conventional design, which provides a signal at a terminal 174. The duration of the time delay is adjustable from 50 to 500 milliseconds by a variable resistor 134; a typical setting is 300 milliseconds. The signal at terminal 174 is conducted as shown on FIG. 12 to the operative input of NOR gate 191 for controlling the slow-speed approach interval 57 of FIG. 6.

Logic Circuit for Clamp, Unclamp, and Jog Signals, FIG. 12

The fault clamp and fault unclamp signals that drive the fault LED amplifier circuit 166 are derived from the logic circuit of FIG. 12. FIG. 12 also shows the manner in which jog clamp and jog unclamp signals are used during setup.

The entire operation of closing or opening the clamp requires less than 1 second in normal operation (FIG. 7) when there is no clamp malfunction such as binding. To prevent a clamp or unclamp signal from remaining on the motor too long, a timing circuit 176 provides a 3-second time limit; this is a safety feature that comes into play if there is a problem in operation. The circuit can then be reset. For example, if the clamp binds in the clamping mode and the 3-second timer times out and turns off the motor, an unclamp command can then drive the clamp open. If the switch is in the clamp mode, an unclamp command drives the motor at full speed in the unclamping direction. It stops upon receiving a proximity switch command from the coil 39 at the preset end of the unclamp travel range.

On FIG. 12, a monostable multivibrator (one-shot) is formed of gates 180, 181, 182, 184, 186, and 191. When a logic 1 occurs at an input of NOR gate 181, either from the normal operation terminal 179 of FIG. 12 (from gate 215 of FIG. 11), or from the jog terminal 243 through OR gate 183, the NOR gate 181 sends a logic zero to OR gate 182. Gate 182 transmits a zero to one input of NOR gate 184, which puts a logic 1 on its output 188. That logic 1 is connected back to another input of the OR gate 180, so the circuit latches itself on, with a 1 at terminal 188.

The circuit is reset when a logic 1 signal from the clamped position sensing circuits occurs at another input terminal 195 of NOR gate 184. It comes from the NAND gate 132 of FIG. 11, and occurs when the clamping operation is complete, as signaled by the clamped position sensor coil 43.

The circuit puts a limitation on the duration of application of power to the motor, for safety. When the latch 180, 184 is set, the zero output of gate 181 starts timing out a circuit 176, comprising capacitor 175 and resistor 177. When the capacitor 175 has discharged sufficiently, the NOR gate 191 (connected as an inverter), produces a 1 at its output terminal 193; that 1 is input to the OR gate 186, which then outputs a 1 to another input of gate 184. That signal changes the output of terminal 188 to zero, resetting the latch of the one-shot multivibrator.

An output terminal 193 of gate 191 is connected to an input of the NAND gate 132, as shown in FIG. 11.

The logic circuits of FIG. 12 are similarly arranged for operation in the unclamp direction.

When switch 223 of FIG. 11 is in the setup position, the terminal 241 of FIGS. 11 and 12 has a logic 1, and the capacitor 175 discharges much more rapidly, through both the resistor 177 and a resistor 190 in parallel, than it would through resistor 177 alone. The time delay of the one-shot multivibrator, which is limited for safety to a maximum of 3 seconds for normal clamp closing operation, is therefore only about 0.2 seconds for a jog step. Components of one monostable multivibrator therefore serve both timing purposes.

When the equipment is in the jog mode the one-shot multivibrators of FIG. 11 are started by a logic 1 signal on terminal 243. When it is in a normal operation mode it is started by a logic 1 command signal at the terminal 179. Both the signal of terminal 243 and the signal of terminal 179 are input to an OR gate 183, whose output is connected to a gate 185 of the unclamp multivibrator. Any starting of the clamp multivibrator 180, 184 therefore resets the unclamp multivibrator 187, 189, and vice versa.

The unclamp circuit on the lower half of FIG. 12 operates in the same manner as the clamp circuit just described.

If the apparatus were to become jammed in an unclamped mode, the signal at terminal 179 would actuate an OR gate 183. The output signal from gate 183 resets the unclamp latch by applying a logic signal to one input of an OR gate 185 whose output actuates a NOR gate 187. The output of 187 is fed back to an OR gate 189, which was holding the unclamp circuit in a latched condition until the signal from OR gate 185 released it. The output of NOR gate 187 is a fault unclamp signal.

Status Signal Outputs. FIG. 13

On FIGS. 8 and 12 three optical couplers, 135, 139, and 143 are shown. Their purposes are to "notify" an operating station (external to the clamp) that clamp and unclamp signals have been properly executed, and in case of a fault, that a fault has occurred. Input signals come to the couplers from, respectively, a clamp logic NAND gate 132, an unclamp oscillator 127, and a fault NOR gate 217 (FIG. 11). Each of the optical couplers is connected with a respective two-wire output switch. The schematic diagram of one such circuit (clamp, 137) is FIG. 13.

A light diode 223 of the optical coupler 135 emits a turn-on signal for a transistor 225, which provides base drive for a transistor 227. That in turn controls semiconductor switch circuits 229, which are connected to the DC side of a rectifier 231. The output circuit handles 150 milliamps, and is compatible with most 120-volt input cards of programmable controllers.

Figure 14:
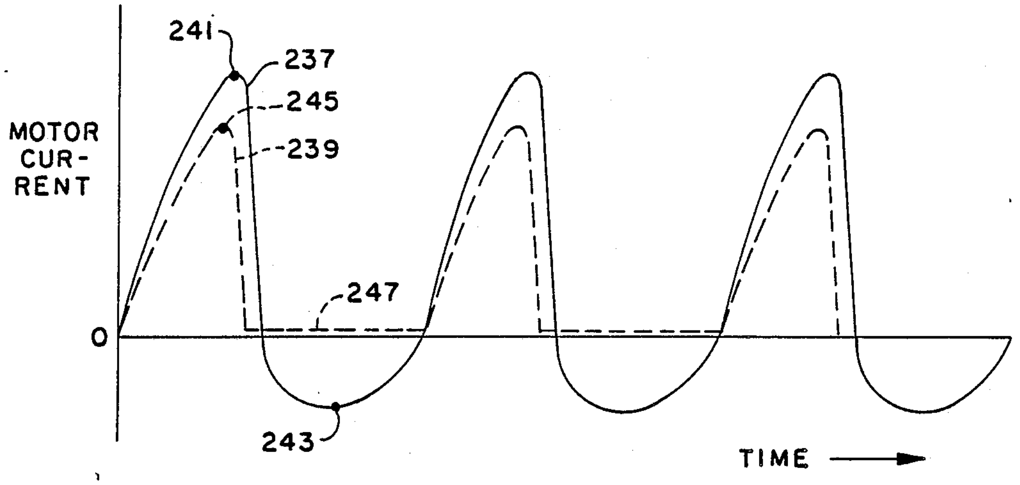
FIG 14 is a graph comparing the swing excursion sizes of motor current with and without dynamic braking between individual current pulses.

Pulse Height Enhancement, FIG. 14

As described above in connection with FIGS. 9 and 10, dynamic braking is provided in the brief time intervals between individual pulses of motor current, by having both semiconductors 101 and 105 in a conducting state in those brief time intervals. This affects the waveform of the current into the motor 11 in a beneficial way. It results in a greater difference between the maxima and minima of motor current than would occur without such frequent dynamic braking. These greater swings of current are achieved without increasing the net torque on the motor. They have the effect of reducing sticking of the clamp due to friction.

FIG. 14 shows, as curve 237, the motor current when dynamic braking is applied between individual pulses of motor current. In the embodiment being described the period of the waveform is 1/60 or 1/120 of a second, depending upon whether the motor is operating at low speed or high speed. The instantaneous swings of current cover a range from a maximum at point 241 to a minimum at a point 243. Curve 239, on the other hand, represents the motor current when the motor is permitted to coast between current pulses. Its excursions of current are between a maximum at a point 245 to a minimum at a point 247.

The speed of the motor 11 is the same when it is driven by current of curve 237 as when it is driven by current of curve 239 because the average torques that they apply to the motor are equal. However, the frictional sticking is much less with curve 237 than with curve 239. The greater swings between extremes as in curve 237 more effectively dislodge sticking parts to reduce the harmful effects of mechanical friction in the system. The cycle-by-cycle dynamic braking of this invention thereby improves the operation of the clamp.

Although only the preferred embodiment of the invention is described above, it will be understood that many variations of the same inventive concepts are possible within the scope of the invention as defined by the claims.

We claim:

1. A controller for an electric clamp which is driven open and closed by an electric motor to which power is connected upon commands, comprising in combination:

(a) means responsive to a command to close the clamp, for providing high-speed travel during a run-up in the closing direction;

(b) proximity sensing means for directly detecting when the clamp reaches a predetermined position, and for initiating thereupon an interval during which the speed of travel is lower;

(c) means for terminating the lower-speed travel after a predetermined time;

(d) means for providing higher power to the clamp thereafter during completion of its closing;

(e) sensing means for directly sensing that the clamp has reached a closed position and for interrupting power flow to the motor thereupon.

2. A controller for an electric clamp as in claim 1 and wherein said motor comprises a reversible motor, and further comprising:

(f) switching means comprising a plurality of switches switchable for reversing the motor to drive the clamp to travel in opening and closing directions;

(g) means responsive to a command to open the clamp, for initiating travel of the clamp in the opening direction;

(h) proximity sensing means for directly sensing that the clamp has reached a predetermined open position and interrupting power flow to the motor thereupon;

(i) said switching means comprising shoot-through protection means, including logic circuit means, for preventing short circuit conduction through only two transistors in series.

3. A controller for an electric clamp as in claim 2 and further comprising means for providing a predetermined maximum time limit for continuous powering of the motor, at which time the power is stopped.

4. A controller for an electric clamp as in claim 2 and further comprising:

means for rectifying power from an AC power source to provide substantially unfiltered DC power for said motor;

means for using different harmonics of the AC power source's frequency for establishing pulses of different frequencies to power the motor at high and low travel speeds.

5. A controller for an electric clamp as in claim 2 and wherein said switching means further comprises:

semiconductor switch means for establishing dynamic braking of the motor upon interruption of power flow to the motor;

said braking means comprising means for providing dynamic braking between individual pulses of input power to the motor.

6. A controller for an electric clamp as in claim 5 and wherein said switching means comprises semiconductor means for switchably establishing an external dynamic braking circuit that conductively links the motor's terminals, and wherein the resistance of the motor itself is at least four times as great as the impedance of the external circuit that conductively links the motor's terminals.

7. A controller for an electric clamp as in claim 6 and wherein said switching semiconductor means for switchably establishing an external dynamic braking circuit comprises MOSFET semiconductor switches.

8. A controller for an electric clamp having a DC electric motor powered by unidirectional rippling voltage derived by unregulated rectification of an AC power source, and having apparatus for open-loop compensation to reduce the effects of AC variations of source voltage on motor speed, comprising:

(a) sensing means for sensing unregulated voltage and producing a control signal in response thereto;

(b) comparator means for comparing the instantaneous value of the rippling voltage with a threshold based upon said control signal and for providing an output dependent upon whether the rippling voltage or the threshold is greater;

(c) control means for producing, in response to said output of said comparator means, a train of pulses that are applied to the motor, said pulses having widths that are determined by the time that the instantaneous value of the rippling voltage exceeds the threshold.

9. A controller for an electric clamp as in claim 8 and further comprising:

(d) means responsive to a command to close the clamp, for providing high-speed travel during a run-up in the closing direction;

(e) sensing means for directly detecting when the clamp reaches a predetermined position, and for thereupon initiating an interval during which the speed of travel is lower;

(f) means for terminating the lower-speed travel after a predetermined time;

(g) means for providing higher power to the clamp thereafter during completion of its closing;

(h) sensing means for directly sensing that the clamp has reached a closed position and interrupting power flow to the motor thereupon.

10. A controller for an electric clamp as in claim 8 and further comprising means for establishing dynamic braking of the motor on a cycle-by-cycle basis upon each interruption of the power flow to the motor.

11. A controller for an electric clamp as in claim 8 and further comprising:

(i) means responsive to a command to open the clamp, for initiating travel of the clamp in the opening direction;

(j) sensing means for directly sensing that the clamp has reached a predetermined open position and for interrupting power flow to the motor thereupon.

12. A controller for an electric clamp as in claim 11 and comprising safety means for, when close and unclose signals occur simultaneously, blocking both of said signals to prevent movement of the clamp in either direction.

13. A controller for an electric clamp as in claim 11 and further comprising:

timing means for providing a predetermined maximum time for the application of said train of pulses of power to said motor;

means for changing said timing means for enabling it to provide a shorter predetermined time for application of pulses to the motor during a jogging step.

* * * * *